(12) United States Patent
Turbell et al.

(10) Patent No.: US 11,582,464 B2
(45) Date of Patent: Feb. 14, 2023

(54) USING MORPHOLOGICAL OPERATIONS TO PROCESS FRAME MASKS IN VIDEO CONTENT

(71) Applicant: Microsoft Technology Licensing, LLC, Redmond, WA (US)

(72) Inventors: Henrik Valdemar Turbell, Redmond, WA (US); David Yuheng Zhao, Redmond, WA (US); Zhuangfei Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/356,177

(22) Filed: Jun. 23, 2021

(65) Prior Publication Data
US 2022/0417532 A1    Dec. 29, 2022

(51) Int. Cl.
*G06T 7/194*    (2017.01)
*G06T 7/174*    (2017.01)
(Continued)

(52) U.S. Cl.
CPC ........... *H04N 19/167* (2014.11); *G06T 5/004* (2013.01); *G06T 5/30* (2013.01); *G06T 7/194* (2017.01);
(Continued)

(58) Field of Classification Search
CPC .. H04N 19/167; H04N 19/132; H04N 19/182; H04N 19/186; G06T 7/194; G06T 5/004; G06T 5/30
See application file for complete search history.

(56) References Cited

U.S. PATENT DOCUMENTS

| | | | | |
|---|---|---|---|---|
| 4,409,611 A | * | 10/1983 | Vlahos | H04N 9/75 348/597 |
| 2015/0334398 A1 | * | 11/2015 | Socek | H04N 19/182 375/240.26 |

(Continued)

FOREIGN PATENT DOCUMENTS

| | | | |
|---|---|---|---|
| CA | 2437003 | * | 12/2003 |
| CA | 3071850 | * | 1/2020 |

(Continued)

OTHER PUBLICATIONS

"Colour banding", Retrieved from: https://en.wikipedia.org/wiki/Colour_banding, May 22, 2021, 2 Pages.

(Continued)

*Primary Examiner* — Zaihan Jiang
(74) *Attorney, Agent, or Firm* — Klarquist Sparkman, LLP

(57) ABSTRACT

A computer implemented method can decode a frame of video data comprising an array of pixels to obtain decoded luma values and decoded chroma values corresponding to the array of pixels, and extract a frame mask based on the decoded luma values. The frame mask can include an array of mask values respectively corresponding to the array of pixels. A mask value indicates whether a corresponding pixel is in foreground or background of the frame. The method can perform a morphological operation to the frame mask to change one or more mask values to indicate their corresponding pixels are removed from the foreground and added to the background of the frame. The method can also identify foreground pixels after performing the morphological operation to the frame mask, and render a foreground image for display based on the decoded luma values and decoded chroma values of the foreground pixels.

20 Claims, 13 Drawing Sheets

(51) Int. Cl.
  *H04N 19/167*  (2014.01)
  *H04N 19/132*  (2014.01)
  *H04N 19/182*  (2014.01)
  *H04N 19/186*  (2014.01)
  *G06T 5/00*  (2006.01)
  *G06T 5/30*  (2006.01)

(52) U.S. Cl.
  CPC ......... *H04N 19/132* (2014.11); *H04N 19/182* (2014.11); *H04N 19/186* (2014.11)

(56) References Cited

U.S. PATENT DOCUMENTS

| | | | | |
|---|---|---|---|---|
| 2016/0065975 | A1* | 3/2016 | Su | H04N 19/186 375/240.01 |
| 2017/0358094 | A1* | 12/2017 | Sun | G06T 7/11 |
| 2018/0310011 | A1* | 10/2018 | Gopalakrishnan | H04N 19/27 |

FOREIGN PATENT DOCUMENTS

| | | | |
|---|---|---|---|
| CN | 101371274 | * | 12/2005 |
| CN | 102547225 | * | 12/2010 |
| CN | 101371274 | * | 12/2015 |
| CN | 106530265 | * | 11/2016 |

OTHER PUBLICATIONS

"Digital watermarking", Retrieved from: https://en.wikipedia.org/wiki/Digital_watermarking, Apr. 14, 2021, 8 Pages.

"Dilation (morphology)", Retrieved from: https://en.wikipedia.org/wiki/Dilation_(morphology), Oct. 18, 2020, 5 Pages.

"Engaging new presentation features in Microsoft Teams", Retrieved from: https://educationblog.microsoft.com/en-us/2021/03/engaging-new-presentation-features-in-microsoft-teams/, Mar. 2, 2021, 8 Pages.

"YUV", Retrieved from: https://en.wikipedia.org/wiki/YUV, May 25, 2021, 17 Pages.

"The Difference Between Chroma Key and Luma Key," Retrieved from: https//www.fraser-harrison-postproduction.blogspot.com/2013/03/the-difference-between-chroma-key-and.html, Mar. 17, 2013, 2 Pages.

"Erosion (morphology)", Retrieved from: https://en.wikipedia.org/wiki/Erosion_(morphology), May 11, 2021, 4 Pages.

"Morphological Image Processing", Retrieved from: https://www.cs.auckland.ac.nz/courses/compsci773s1c/lectures/ImageProcessing-html/top4.htm, May 11, 2021, 7 Pages.

"Types of Morphological Operations", Retrieved from: https://www.mathworks.com/help/images/morphological-dilation-and-erosion.html, May 11, 2021, 4 Pages.

* cited by examiner

Figure 2 (Prior Art)
210
220
230

Figure 7

Receive a frame mask comprising an array of mask values respectively corresponding to the array of pixels, wherein a mask value indicates whether a corresponding pixel is in foreground or background of the frame. 710

Perform a morphological operation to the frame mask, wherein the morphological operation changes one or more mask values to indicate their corresponding pixels are removed from the background and added to the foreground of the frame. 720

Identify foreground pixels and background pixels. 730

Convert original luma values of the foreground pixels to updated luma values, wherein the original luma values are bounded within a first luma range, the updated luma values are bounded within a second luma range, and the second luma range is shifted and/or compressed from the first luma range. 740

Set luma values of the background pixels. 750

700

USING MORPHOLOGICAL OPERATIONS TO PROCESS FRAME MASKS IN VIDEO CONTENT

BACKGROUND

In a video call, foreground segmentation (also referred to as "background subtraction") can be performed at the sender side, which can separate each frame of video image into foreground and background. The sender can generate a frame mask, such as a foreground mask (also referred to as "alpha mask"), per video frame. For video containing color images, a video frame can also be referred to as a "color frame." In some circumstances, such a frame mask can be used on the sender side, e.g., to blur or replace the background of the video-captured person before transmitting the video. In other circumstances, such a frame mask can be transmitted to the receiver side, where the video-captured person without the original background can be rendered on top of screen sharing content (e.g., using a virtual background or in the so-called "weather person presentation mode"). For example, the receiver can use the frame mask to show the video-captured person without the original background as a participant in a team meeting of multiple participants (e.g., in the "Together Mode" scene of Microsoft Teams®). However, transmitting the frame masks reliably and efficiently from the sender to the receiver can pose technical challenges. Therefore, there exists ample opportunity for improvement in technologies related to transmitting frame masks in a video stream.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are applied for embedding frame masks in a video stream. According to some solutions, a video encoder can encode a frame of video data comprising an array of pixels to generate an encoded video frame, and transmit the encoded video frame. When encoding the frame of video data, the video encoder can receive a frame mask comprising an array of mask values respectively corresponding to the array of pixels, wherein a mask value indicates whether a corresponding pixel is in foreground or background of the frame. The video encoder can perform a morphological operation to the frame mask, wherein the morphological operation changes one or more mask values to indicate their corresponding pixels are removed from the background and added to the foreground of the frame.

According to some other solutions, a video decoder can decode a frame of video data comprising an array of pixels to obtain decoded luma values and decoded chroma values corresponding to the array of pixels. The video decoder can extract a frame mask based on the decoded luma values. The frame mask includes an array of mask values respectively corresponding to the array of pixels, wherein a mask value indicates whether a corresponding pixel is in foreground or background of the frame. The video encoder can perform a morphological operation to the frame mask to change one or more mask values to indicate their corresponding pixels are removed from the foreground and added to the background of the frame. The video encoder can also identify foreground pixels after performing the morphological operation to the frame mask, and render a foreground image for display based on the decoded luma values and decoded chroma values of the foreground pixels.

As described herein, a variety of other features and advantages can be incorporated into the technologies as desired.

BRIEF DESCRIPTION OF THE DRAWINGS

FIG. 2 shows example results of embedding frame masks in a video frame by setting luma values of all background pixels to a predefined value.

FIG. 7 is a flowchart of an example detailed method of embedding a frame mask in the video frame.

DETAILED DESCRIPTION

Overview of Transmitting a Video Stream Embedded with Frame Masks

As described herein, technologies can be applied to efficiently embed frame masks in a video stream.

For example, the technologies described herein can be implemented by a video processing system including a video encoder (e.g., video encoding software running on a computing device) and/or a video decoder (e.g., video decoding software running on a computing device). The video encoder can receive video data to be encoded (e.g., from a file, from a video capture device, from a computer desktop or application window, or from another source of real-world or computer-generated video data). The video encoder can perform operations to encode the video data (e.g., to encode each of a sequence of video frames) and transmit the encoded video data to one or more receiving devices containing respective video decoders. Specifically, the video encoder can embed a frame mask, e.g., a foreground mask or a background mask, in each video frame to be transmitted.

The video decoder can receive encoded video data and perform operations to decode the video data (e.g., to decode each of the sequence of video frames). Specifically, the video decoder can extract a frame mask from each video frame, and use the extracted frame mask to render a foreground image corresponding to the video frame for display.

In the technologies described herein, video transmission is based on the YUV video encoding format. YUV is a color encoding format typically used as part of a color image or video transmission. It encodes a color image or video by taking human perception into account, allowing reduced bandwidth for chrominance components than using a direct RGB-representation. The Y in YUV stands for luminance or luma component (i.e., the brightness), and U and V are the chrominance or chroma (i.e., color) components. Through a process called color space conversion, a video camera can convert the RGB data captured by its sensors into either composite analog signals (YUV) or component versions. For rendering on screen, all these color spaces must be converted back again to RGB by the TV or display system. When no chroma data is contained in the U and V channels, the video stream contains only gray scale image frames defined by the luma values contained in the Y channel.

Figure 1:
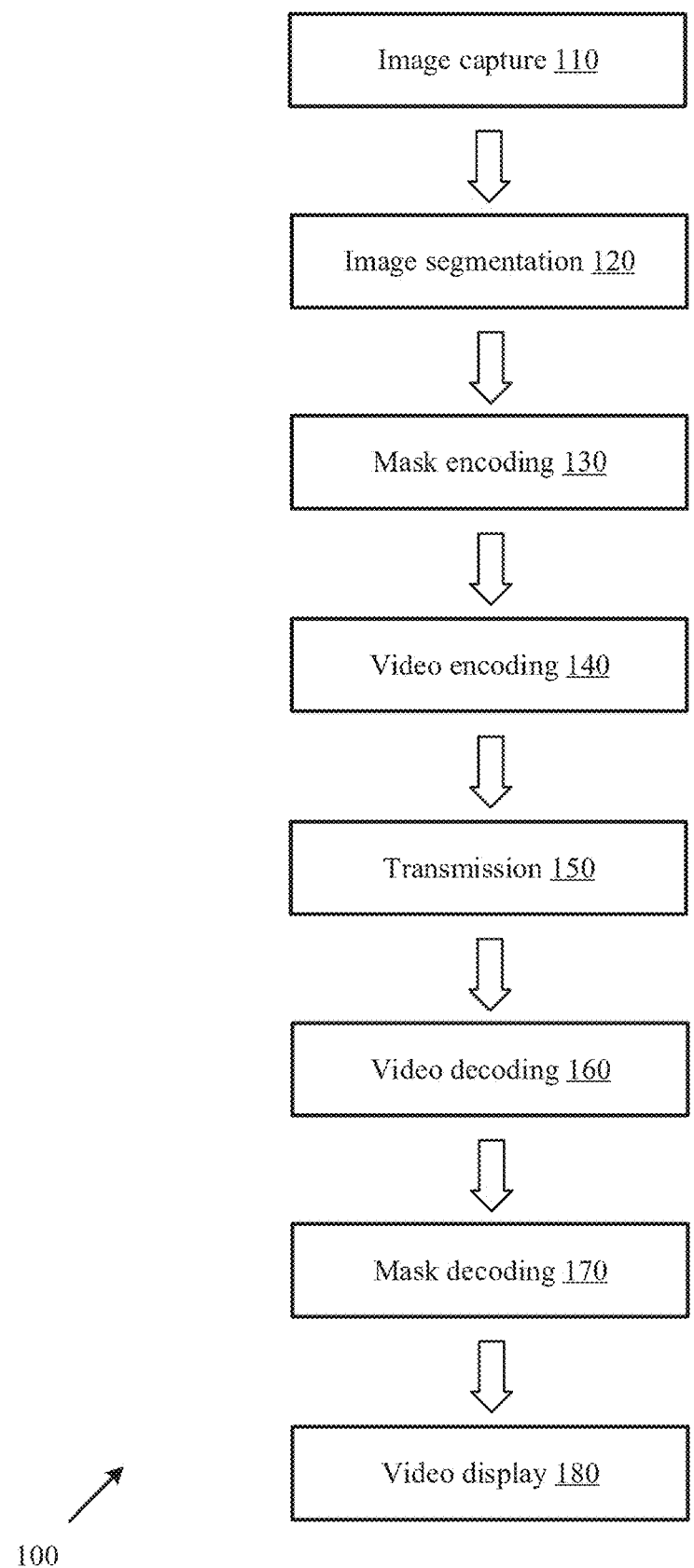
FIG. 1 is an example flow diagram depicting data flow of transmitting a video stream embedded with frame masks.

FIG. 1 is an example flow diagram 100 depicting data flow of transmitting a video stream embedded with frame masks, for example, during a video call between a sender and a receiver. At the sender side, video images of the sender can be captured by a video camera or other video recording devices at 100. Image segmentation can be performed at 120 to separate each frame of video image into foreground and background. At 130, a video encoder (as described more fully below) can generate and encode a frame mask for each video frame. At 140, video frames containing respective frame masks can be encoded by the video encoder, e.g., by applying a compression algorithm to reduce the size of the video data. Then at 150, encoded video data can be transmitted from the sender to the receiver (wired or wirelessly). At the receiver side, the received video data (which is encoded and embedded with frame masks) can be decoded by a video decoder (as described more fully below) at 160. At 170, the video decoder can further extract or decode a frame mask for each video frame. Then at 180, the video decoder can use the extracted frame mask to render a foreground image of the video frame for display.

In some scenarios, the original background of the sender can be preserved during video transmission of the video frames so that the receiver has the option to remove, replace, or keep the original background. In other scenarios, the sender may choose not to transmit her background images to ensure privacy and/or for other reasons. For example, in a weather person presentation mode, images of the sender can be shown on a video monitor without displaying her original background.

Overview of Frame Masks

Generally, a frame mask corresponding to a video frame can be represented by a grayscale image that has the same resolution as the video frame. For example, both the frame mask and the video frame can be represented by an 8-bit image. In such circumstances, white pixels with mask value 255 can represent foreground, black pixels with mask value 0 can represent background, and mask values between 0 and 255 can be used to represent different and smoothly feathered contours. In the examples described below, each video frame has an 8-bit resolution, although it is to be understood that the video frame can have other resolutions, e.g., 10-bit, 12-bit, 16-bit, 24-bit, 32-bit, etc.

In certain embodiments, binary frame masks can be used. For example, each pixel can be represented by a single mask bit which indicates the pixel is in the foreground (i.e., the pixel is a foreground pixel) or background (i.e., the pixel is a background pixel) of the image frame. In some circumstances, a binary mask value 1 can indicate the corresponding pixel is in the foreground and a binary mask value 0 can indicate the corresponding pixel is in the background. Such a binary frame mask can be referred to as a foreground mask. In some circumstances, a binary mask value 1 can indicate the corresponding pixel is in the background and a binary mask value 0 can indicate the corresponding pixel is in the foreground. Such a binary frame mask can be referred to as a background mask. Although 0 and 1 are described herein as example binary values, it is to be understood that the binary mask values can be represented by other numbers so long as they can distinguish foreground pixels from background pixels.

A frame mask represented by the grayscale image can be converted to a binary mask by applying a threshold function. For example, a grayscale mask value M (e.g., M is between 0 and 255) can be converted to 1 if M is greater than a predefined threshold T (e.g., T can be set to 127) or 0 if M is less than or equal to T. The converted binary mask can be a foreground mask. Alternatively, a grayscale mask value M (e.g., M is between 0 and 255) can be converted to 0 if M is greater than a predefined threshold T (e.g., T can be set to 127) or 1 if M is less than or equal to T. The converted binary mask can be a background mask.

Overview of Frame Mask Transmission

Different approaches can be used to transmit the frame masks associated with video frames in a video stream.

According to one approach, the frame masks can be transmitted as a separate video stream (in addition to the original video stream comprising the video frames). Such an approach can increase bandwidth and require certain synchronization between video frames and corresponding frame masks.

According to another approach, the frame masks can be transmitted as a separate color channel in the normal video stream. This approach would require video coding of a four-channel image. Due to the lack no industry standard for such encoding scheme, reusing existing optimized coders in either software or hardware can be difficult.

According to another approach, the video stream can be transmitted by doubling the size of the video frames (e.g., doubling the with or height of the video frames), and the frame masks can be placed next to the corresponding video frames during transmission. This approach can rely on standard video coders. However, a metadata flag is required to indicate that the frame masks are concatenated next to the corresponding video frames so that the receiver can split the two parts. For receivers not aware of this metadata flag, the frame masks will be disturbingly displayed next to the video.

According to yet another approach, the frame masks can be transmitted together with the video frames by embedding the mask information into the video stream. This approach can also rely on standard video coders. As described in more details below, the technologies described herein can transmit the frame masks reliably and efficiently from the sender to the receiver by embedding the frame masks in the video stream.

The technologies described herein can be implemented by various video processing technologies. For example, the technologies can be implemented by AV1 video encoders and decoders, by H.264 video encoders and decoders, by HEVC video encoders and decoders, by Versatile Video Coding (VVC) video encoders and decoders, and/or by video encoders and decoders that operate according to another video coding standard.

Frame Mask Embedding Based on Luma Keying

One example method of embedding a frame mask in a video frame is to set all background pixels to a predefined luma value. This is known as luma keying, which is commonly used to composite a foreground clip over a background clip based on the luminance levels in a video frame. Specifically, luma keying can set a brightness level. All of the brighter or darker pixels from the set brightness level can be turned off, thereby making them transparent.

For example, FIG. 2 illustrates embedding a frame mask in a video frame by means of luma keying. The original video frame 210 shows a person over a background. By setting all background pixels to zero (i.e., black), a frame mask can be embedded in the video frame 220 where all pixels having non-zero luma values can be deemed to be foreground pixels. Alternatively, by setting all background pixels to 255 (i.e., white), a frame mask can be embedded in the video frame 230 where all pixels having luma values less than 255 can be deemed to be in the foreground.

While frame masks can be embedded in a video stream using such simple luma keying technique, particular challenges exist when the video encoder/decoder use lossy video compression algorithms. This can be explained by the following example. Consider a video frame where each luma value is represented with 8 bits in range [0, 255]. Increasing the luma value by 1 least significant bit (LSB) makes the pixel slightly brighter. Conventionally, video coding commonly uses "Studio Swing," which shifts and scales the luma value to the range [16, 236] rather than using the full range of [0, 255]. Thus, if a frame mask is embedded in the video frame by setting the luma value for all background pixels to 0, there will be a "safety margin" of 16 LSB to the lowest allowed foreground luma value. To extract the frame mask at the receiver side, a threshold of 8 LSB can be specified such that pixels with luma values greater than 8 are deemed to be in the foreground and pixels with luma values less than or equal to 8 are deemed to be in the background. If the video coding artifacts (due to its lossy compression algorithm) stay within 8 LSB, the frame mask embedded in the video frame can be faithfully extracted. However, if the video coding artifacts are greater than 8 LSB (e.g., in low bandwidth scenarios), the extracted frame mask by the receiver will not match the original frame mask embedded in the video frame.

Figure 11:
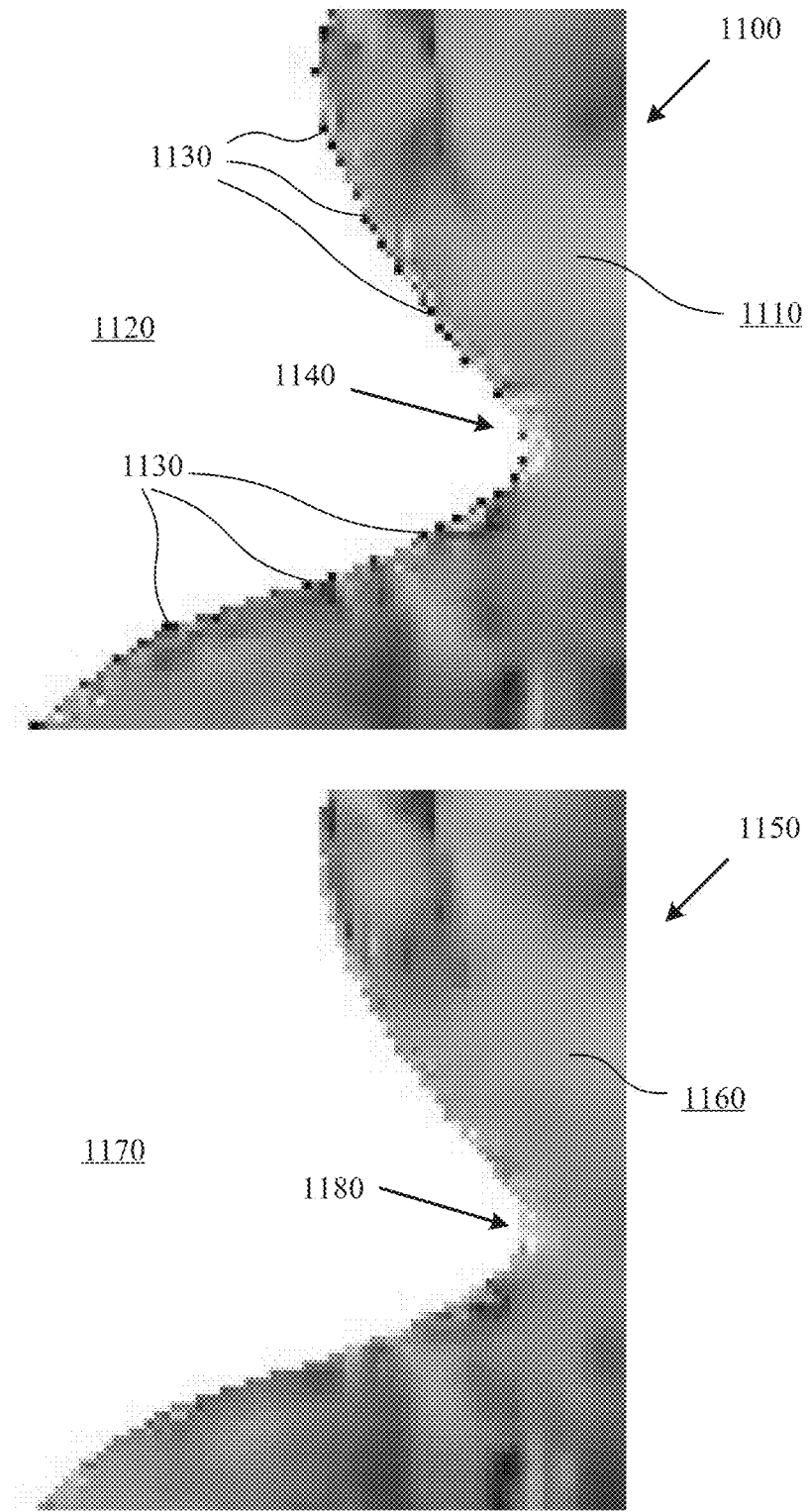
FIG. 11 shows example results of reducing background bleeding effect in a video frame by applying morphological operations to a frame mask embedded in the video frame.

Another challenge associated with luma keying is the undesired "background bleeding" effect. Specifically, depending on the underlying compression algorithm, video coding may mix the value of a pixel with the values of its neighboring pixels. Thus, when setting the luma value of background pixels to 0 (i.e., black color), the foreground contour pixels are likely to be contaminated by the background black color. Likewise, when setting the luma value of background pixels to 255 (i.e., white color), the foreground contour pixels are likely to be contaminated by the background white color. In other words, the color of the background pixels can bleed into the foreground, making it darker (or brighter) around the contour. One such example is illustrated in FIG. 11, as explained further below.

The technologies described herein can overcome the above limitations by using luma mapping and/or morphological operations, as explained further below.

Frame Mask Embedding Based on Chroma Keying

Another example method of embedding a frame mask in a video frame is chroma keying, which designates a specific color and makes it transparent. As noted above, color information in the YUV space is stored in the chrominance or chroma channels U and V. In video coding, these color channels are normally transmitted at half resolution (for both horizontal and vertical resolutions). A straightforward chroma keying by setting background pixels to some fixed chroma values (e.g., green color) would only allow transmitting the frame mask at half resolution. Sometimes this may lead to jaggy edges that are visible at the receiver end.

Figure 3:
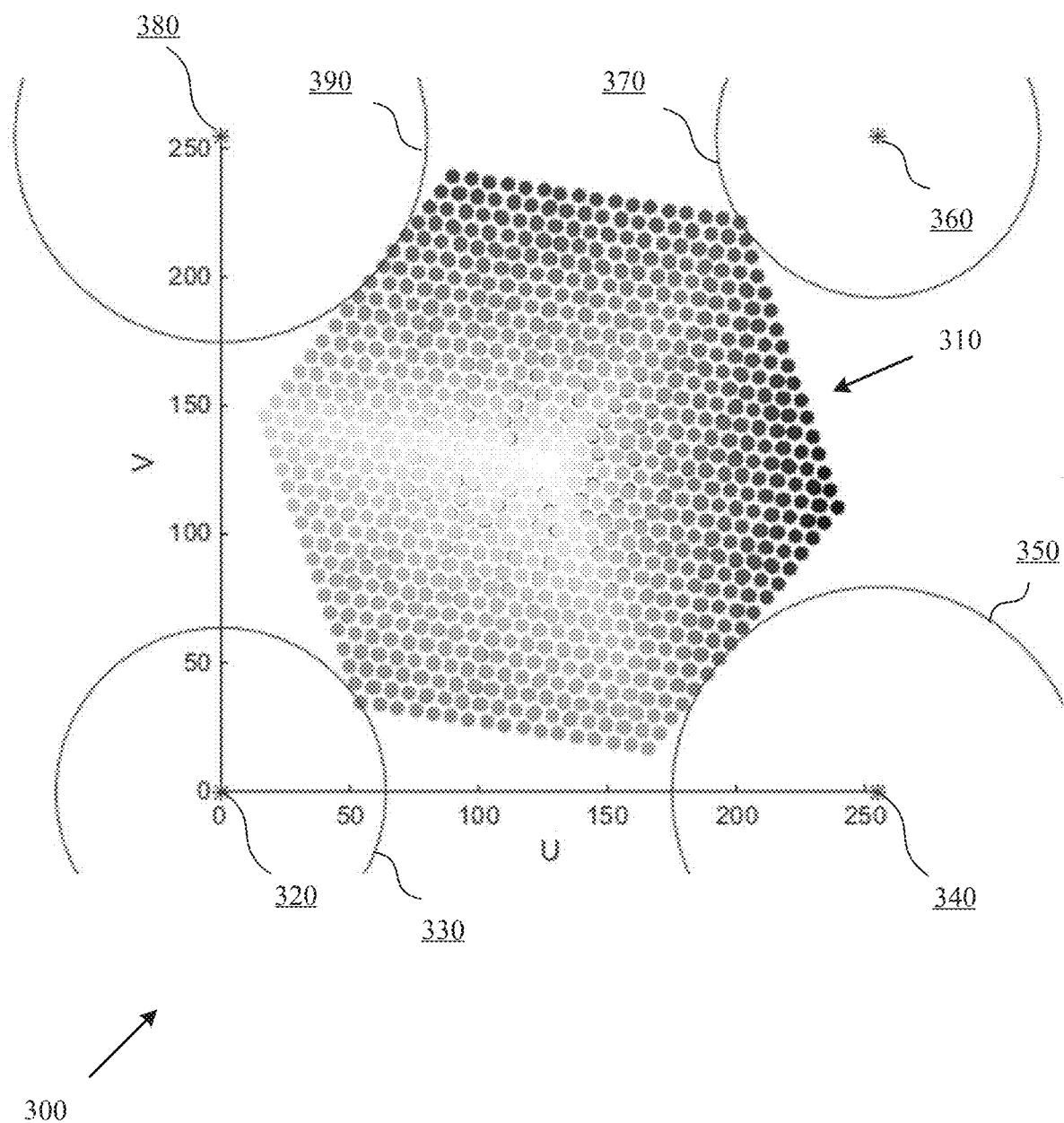
FIG. 3 is a diagram illustrating safety margins to video coding artifacts with regard to two chroma channels of the YUV color space.

FIG. 3 illustrates safety margins to video coding artifacts with regard to two chroma channels of the YUV color space 300. Generally, valid RGB values (assuming 8-bit resolution for each color component) can be converted to U and V chroma values by the following equations:

$$U=(-38R-74G+112B)/256+128$$

$$V=(112R-94G-18B)/256+128$$

As shown, valid RGB values converted to the U-V color space 300 are confined to a hexagon 310. For chroma keying, the background pixels can be set to fixed (U, V) chroma values corresponding to any of the four "corners" at the U-V color space, i.e., 320, 340, 360, and 380, which correspond to U-V coordinate (0, 0), (255, 0), (255, 255), and (0, 255), respectively.

As shown, the "safety margin" to the corners 320, 340, 360, and 380 are indicated by respective circles 330, 350, 370, and 390. One property of the U-V color space is that it has relatively larger safety margins than luma channel. For example, the radius of the safety margin circles shown are between 64 and 80 LSB, and the corners 340 and 380 (which are respectively closest to the blue color and red color) have the largest safety margin.

In certain circumstances, it may be desirable to have the original background as a visualization alternative on the receiver side. With luma keying or chroma keying setting a flat background, the original background is lost. However, with chroma keying, it is possible to keep the luma values and set the chroma values to a fixed flat value. For example, by setting (U, V)=(128, 128) for all background pixels, a monochrome background is generated which can serve as a reasonable representation of the original, colored, background. Since the foreground is likely to contain gray pixels with (U, V) values around 128, another safer chroma keying approach is to code chroma with one of the corner values (0, 0), (0, 255), (255, 0), (255, 255).

In certain embodiments, both luma and chroma information can be combined to improve the robustness of the frame mask coding. For example, each 2×2 block in an image has four luma value and two chroma values. By utilizing all six values, it is possible to achieve a mask coding that is more robust against coding artifacts.

Example Video Processing System

Figure 4:
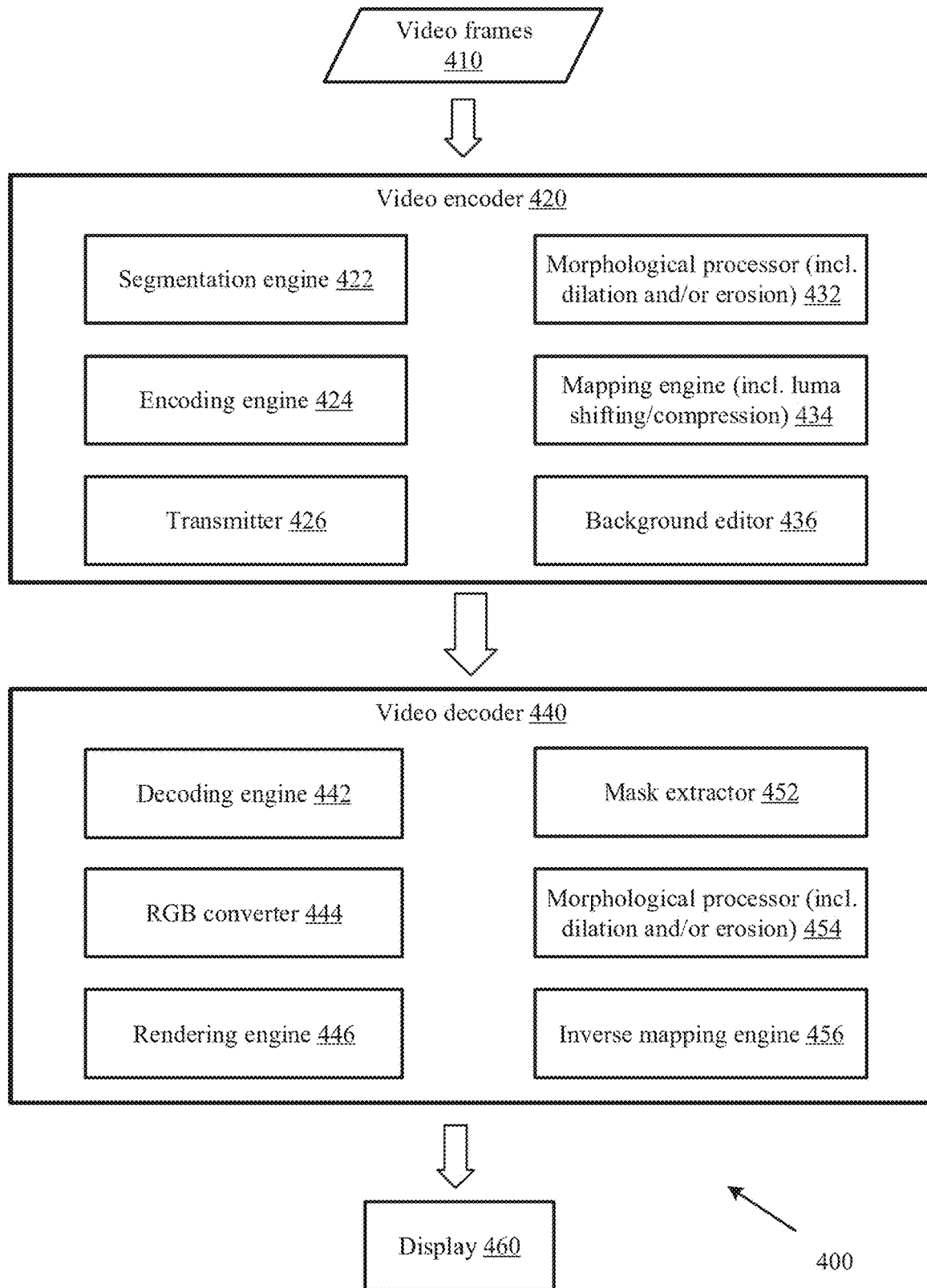
FIG. 4 is a block diagram depicting an example video processing system including a video encoder and a video decoder.

FIG. 4 shows a block diagram of an example video processing system 400 including a video encoder 420 (at a sender side) and a video decoder 440 (at a receiver side) that support embedding frame masks in a video stream.

As shown, the video encoder 420 can receive video frames 410, which can be provided by any video source (e.g., a video capture device, a video file, etc.). Each video frame can comprise an array of pixels, and each pixel can have corresponding luma value (e.g., Y) and chroma values (e.g., U and V). The video encoder 420 can embed a frame mask into each video frame. The frame mask includes mask values corresponding to pixels in the video frame, and each mask value indicates whether a corresponding pixel is in foreground or background of the video frame. The video encoder 420 can encode the video frame, which is embedded with the frame mask, according to a video coding algorithm. The encoded video frame can be transmitted to and received by the video decoder 440. The video decoder 440 can extract a corresponding frame mask from the video frame and use the extracted frame mask to render a foreground image for displaying on a display device 460.

In the depicted example, the video encoder 420 includes a segmentation engine 422, an encoding engine 424, a transmitter 426, a morphological processor 432, a mapping engine 434, and a background editor 436. In other examples, some of the depicted components can exist outside the video encoder 420. For example, the segmentation engine 422 and/or the transmitter 426 can be external units or modules that work in collaboration with the video encoder 420. In certain examples, some of the depicted components can be optional. For example, the video encoder 420 may comprise the morphological processor 432 but not the luma mapping engine 434. In another example, the video encoder 420 may comprise the luma mapping engine 434 but not the morphological processor 432.

The segmentation engine 422 can include hardware and/or software configured to separate each received video frame into foreground and background, and generate a frame mask (e.g., a foreground mask or a background mask) indicating foreground pixels and background pixels. The morphological processor 432 can include hardware and/or software configured to perform morphological operation to the frame mask, e.g., to dilate the foreground mask or erode the background mask, as described in more details below. The mapping engine 434 can include hardware and/or software configured to implement a mapping function (e.g., luma shifting and/or luma mapping) which maps the luma values of foreground pixels from a first range to a second range (similar mapping function can also be applied to chroma values), as described further below. The background editor 436 can include hardware and/or software configured to set the luma values (and/or chroma values) of the background pixels, thereby embedding the frame mask in the luma channel (and/or chroma channels) of the video frame. The encoding engine 424 can include hardware and/or software configured to encode the video frame data (including both luma values and chroma values), which is embedded with the frame mask, according to a specific video compression algorithm. The transmitter 426 can be configured to transmit the encoded video frame data, which can be received by the video decoder 440.

In the depicted example, the video decoder 440 includes a decoding engine 442, an RGB converter 444, a rendering engine 446, a mask extractor 452, a morphological processor 454, and an inverse mapping engine 456. In other examples, some of the depicted components can exist outside the video decoder 440. For example, the RGB converter 444 and/or the rendering engine 446 can exist outside and work together with the video decoder 440. In certain examples, some of the depicted components can be optional. For example, the video decoder 440 may comprise the morphological processor 454 but not the luma inverse mapping engine 456. In another example, the video decoder 440 may comprise the luma inverse mapping engine 456 but not the morphological processor 454.

The decoding engine 442 can include hardware and/or software configured to decode (e.g., by implementing a specific video decompression algorithm) the received video frame data to obtain decoded luma values and decoded chroma values corresponding to the array of pixels in the video frame. The mask extractor 452 include hardware and/or software configured to extract a frame mask based on the decoded luma (and/or chroma) values. Because of the video coding artifacts (e.g., due to the lossy compression algorithm), the decoded luma values and chroma values generated by the decoding engine 442 (at the receiver side) may differ from the original luma values and chroma values encoded by the encoding engine 424 (at the sender side). Thus, the extracted frame mask obtained by the mask extractor (at the receiver side) may also differ from the original frame mask embedded in the original video frame (at the sender side).

The morphological processor 454 can include hardware and/or software configured to perform morphological operation to the extracted frame mask, e.g., to erode the foreground mask or dilate the background mask, as described in more details below. The morphological operation performs by the morphological processor 454 (at the receiver side) and the morphological operations performed by the morphological processor 432 are configured to be dual operations with respect to each other so that they have opposite effects on the frame mask. As described herein, the morphological processor 454 is deployed to operate on the extracted frame mask (at the receiver side) if and only if the morphological processor 432 is deployed to operate on the original frame mask (at the sender side).

The inverse mapping engine 456 can include hardware and/or software configured to implement an inverse mapping function which converts the decoded luma values of the foreground pixels identified by the frame mask to new luma values. As described further below, the inverse mapping function can reverse the mapping function performed by the mapping engine 434 (at the sender side) so that the new luma values are bounded within the first luma range, i.e., the same luma range as the original luma values before being processed by the mapping engine 434 (similar inverse mapping function can also be applied to decoded chroma values). As described herein, the inverse mapping engine 456 is deployed to operate on the decoded luma (and/or chroma) values (at the receiver side) if and only if the mapping engine 434 is deployed to operate on original luma (and/or chroma) values (at the sender side).

The RGB converter 444 can include hardware and/or software configured to convert the decoded luma values and decoded chroma values of the foreground pixels (which can be identified by the extracted frame mask) to corresponding RGB color values. The rendering engine 446 can include hardware and/or software configured to render a foreground image for display based on the decoded luma values and decoded chroma values (or the converted RGB values) of the foreground pixels.

In practice, the systems and subsystems shown herein, such as system 400, the video encoder 420 and the video decoder 440, can vary in complexity, with additional functionality, more complex components, and the like. For example, there can be additional functionality within the video encoder 420 and/or video decoder 440. Additional components can be included to implement security, redundancy, coding/decoding efficiency, noise tolerance, and the like.

The described computing systems can be networked via wired or wireless network connections, including the Internet. Alternatively, systems can be connected through an intranet connection.

The system 400 and any of the other systems/subsystems described herein can be implemented in conjunction with any of the hardware components described herein, such as the computing systems described below (e.g., processing units, memory, and the like). In any of the examples herein, the luma values, the chroma values, the frame masks, various algorithm parameters, and the like can be stored in one or more computer-readable storage media or computer-readable storage devices. The technologies described herein can be generic to the specifics of operating systems or hardware and can be applied in any variety of environments to take advantage of the described features.

Figure 5:
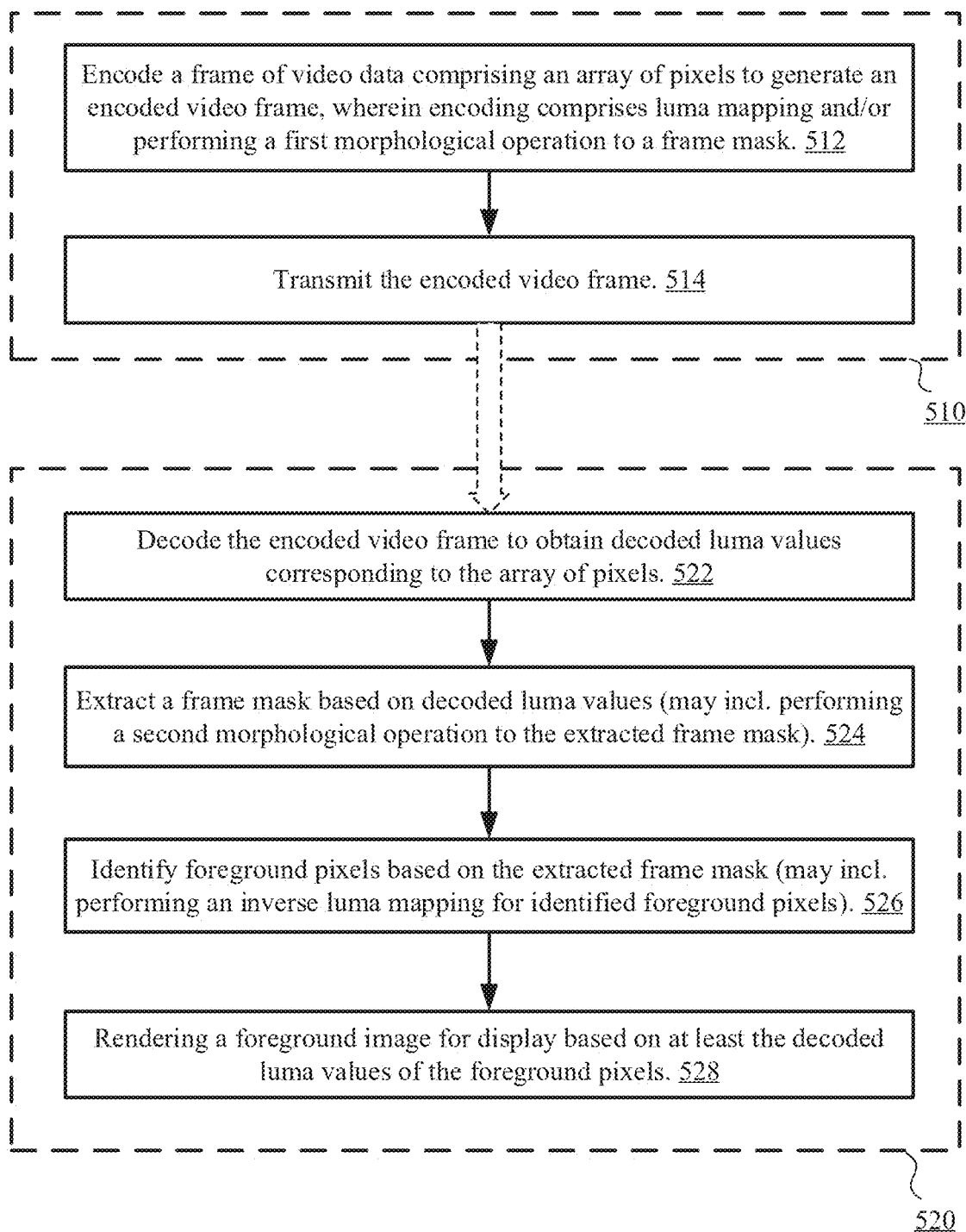
FIG. 5 is a flowchart of an example overall method for encoding and decoding a video frame embedded with a frame mask.

Example Overall Method for Encoding and Decoding a Video Frame Embedded with a Frame Mask FIG. 5 is a flowchart depicting an example overall method 500 of implementing technologies for embedding frame masks in a video stream. The method 500 can be performed, for example, by the system of FIG. 4.

At 512, the method 500 can encode (e.g., using the video encoder 420) a frame of video data comprising an array of pixels to generate an encoded video frame. As described more fully below, encoding the video frame can include applying a luma mapping function to luma values of the foreground pixels and/or performing a first morphological operation to a frame mask.

At 514, the method 500 can transmit the encoded video frame, e.g., to one or more video receivers.

At 522, the method 500 can decode (e.g., using the video decoder 440) the received (encoded) video frame to obtain at least decoded luma values corresponding to the array of pixels.

At 524, the method 500 can extract a frame mask based on the decoded luma values. In certain embodiments, a second morphological operation can be performed on the extracted frame mask, wherein the first and second morphological operations are dual operations that have opposite effects, as described further below.

At 526, the method 500 can identify foreground pixels based on the extracted frame mask. In certain embodiments, an inverse mapping function can be applied to the luma values of the identified foreground pixels, wherein the inverse mapping function can reverse the mapping function applied at 512, as described further below.

At 528, the method 500 can render a foreground image for display based on at least the decoded luma values of the foreground pixels.

The operations depicted in the flowchart 500 can be separated into two groups 510 and 520, based on where the operations are performed. Group 510 includes operations (e.g., 512 and 514) that can be performed at a video sender side (e.g., by the video encoder 420), and group 520 includes operations (e.g., 522, 524, 526 and 528) that can be performed at a video receiver side (e.g., by the video decoder 440).

Although the method 500 depicted in FIG. 5 includes operations in both groups 510 and 520, it is to be understood that the method can include operations contained in group 510 only or group 520 only. In other words, in certain embodiments, the method 500 can be restricted to operations conducted at the sender side (e.g., a method implemented by the video encoder 420), whereas in certain embodiments, the method 500 can be restricted to operations conducted at the receiver side (e.g., a method implemented by the video decoder 440).

The method 500 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

Example Method for Embedding a Frame Mask in a Video Frame

Figure 6:
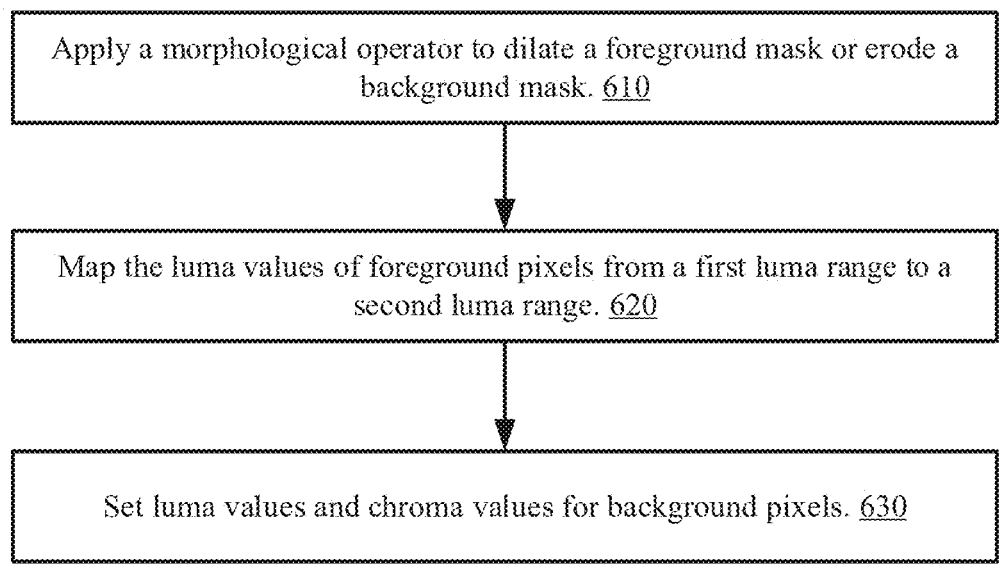
FIG. 6 is a flowchart of an example overall method of embedding a frame mask in the video frame.

FIG. 6 shows a flowchart depicting of an example overall method 600 of embedding a frame mask in the video frame, and the method 600 can be implemented by a video encoder (e.g., 420).

At 610, the method 600 can apply a morphological operator to a frame mask. For example, the method can apply a morphological operator to dilate a foreground mask or erode a background mask, as described in more details below.

At 620, the method 600 can map the luma values of foreground pixels (identified by the frame mask) from a first luma range to a second luma range.

At 630, the method 600 can set luma values and chroma values for background pixels (identified by the frame mask), thereby embedding the frame mask in the video frame.

The method 600 depicted in FIG. 6 includes both morphological operations (at 610) and mapping operations (at 620). Alternatively, either or the morphological operation (at 610) or the mapping operation (at 620) can be optional. For example, the method 600 can include operations at 610 and 630 only, or operations at 620 and 630 only.

FIG. 7 shows a flowchart depicting of an example detailed method 700 of embedding a frame mask in the video frame, and the method 700 can be implemented by a video encoder (e.g., 420).

At 710, the method 700 can receive a frame mask comprising an array of mask values respectively corresponding to the array of pixels. The mask value indicates whether a corresponding pixel is in foreground or background of the frame. For example, a mask value 1 can indicate a foreground pixel and a mask value 0 can indicate a background pixel, or vice versa. The frame mask can be generated by a segmentation engine (e.g. 422).

At 720, the method 700 can perform a morphological operation to the frame mask (e.g., using the morphological operator 432). Such morphological operation can change one or more mask values to indicate their corresponding pixels are removed from the background and added to the foreground of the frame (e.g., via foreground dilation or background erosion), as described in more details below.

At 730, the method 700 can identify foreground pixels and background pixels, e.g., based on the mask values in the frame mask.

At 740, the method 700 can convert original luma values of the foreground pixels to updated luma values (e.g., using the mapping engine 434). As described further below, the original luma values are bounded within a first luma range, the updated luma values are bounded within a second luma range, and the second luma range is shifted and/or compressed from the first luma range.

At 750, the method 700 can set the luma (and chroma) values of the background pixels (e.g., using the background editor 436), thereby embedding the frame mask in the video frame.

Similarly, the method 700 depicted in FIG. 7 includes both morphological operations (at 720) and mapping (i.e., converting) operations (at 740). Alternatively, either the morphological operation (at 720) or the mapping operation (at 740) can be optional. For example, in certain embodiments, the method 700 can exclude the morphological operations (at 720 or exclude the mapping operation (at 740).

Figure 8:
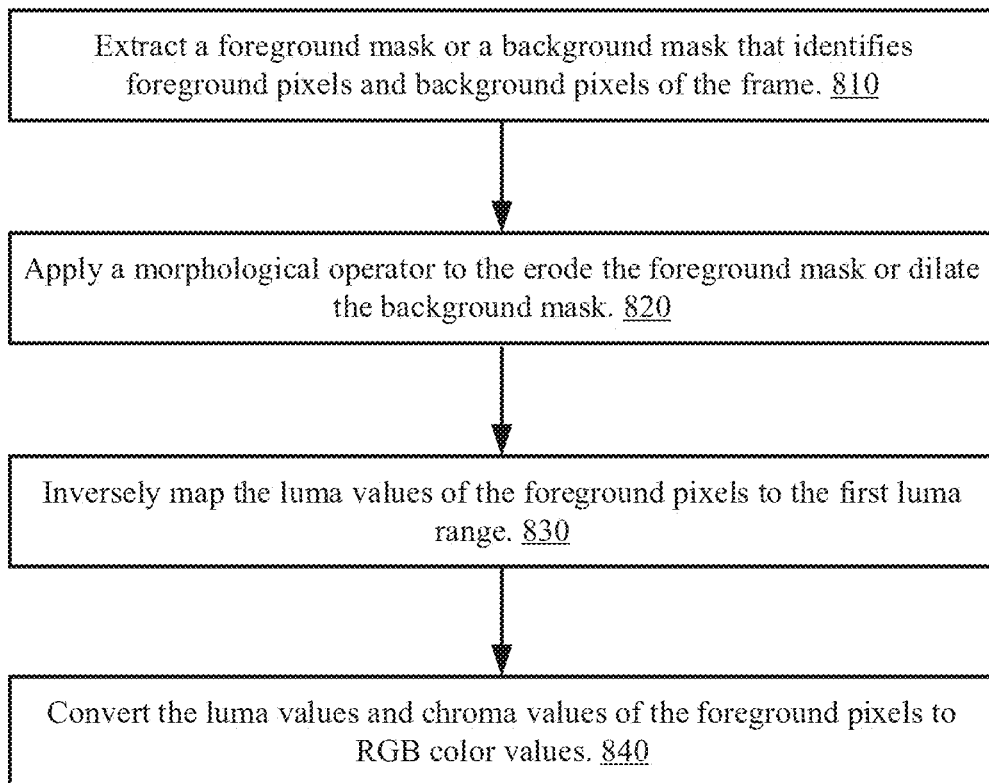
FIG. 8 is a flowchart of an example overall method of extracting a frame mask from a video frame and using the frame mask to obtain foreground data.

Example Method for Extracting a Frame Mask from a Video Frame and Using the Frame Mask to Render a Foreground Image FIG. 8 is a flowchart depicting an example overall method 800 of extracting a frame mask from a video frame and using the frame mask to obtain foreground data. The depicted method 800 can be implemented by a video decoder (e.g., 440).

At 810, the method 800 can extract a frame mask (e.g., a foreground mask or a background mask) that identifies foreground pixels and background pixels of the video frame. As noted above, the extracted frame mask at the receiver side can be different from the original frame mask embedded in the video frame at the sender side.

At 820, the method 800 can apply a morphological operator to the extracted frame mask, e.g., by eroding the foreground mask or dilating the background mask. As noted above, the morphological operations performed at the receiver side and the sender side are configured to be dual operations and have opposite effects on the frame mask.

At 830, the method 800 inversely map the luma values of the foreground pixels to the first luma range that is described above in FIGS. 6-7. As noted above, the video coding artifacts (e.g., due to the lossy compression algorithm) can cause the decoded luma values at the receiver side to be different from the original luma values encoded at the sender side. Thus, before applying the inverse mapping, the luma values of the foreground pixels at the receiver side can have a range that is different from the second luma range that is described above in FIGS. 6-7.

At 840, the method 800 can convert the luma values and chroma values of the foreground pixels to RGB color values (e.g., using the RGB converter 444), which can be used to render the foreground image (e.g., using the rendering engine 446) in a video display.

The method 800 depicted in FIG. 8 includes both morphological operations (at 820) and inverse mapping operations (at 830). Alternatively, either the morphological operation (at 820) or the inverse mapping operation (at 830) can be optional. For example, if no morphological operation (e.g., 610 or 720) is performed at the sender side, then the morphological operation (at 820) at the receiver side can be excluded. Likewise, if no mapping operation (e.g., 620 or 740) is performed at the sender side, then the inverse mapping operations (at 830) can be excluded.

Figure 9:
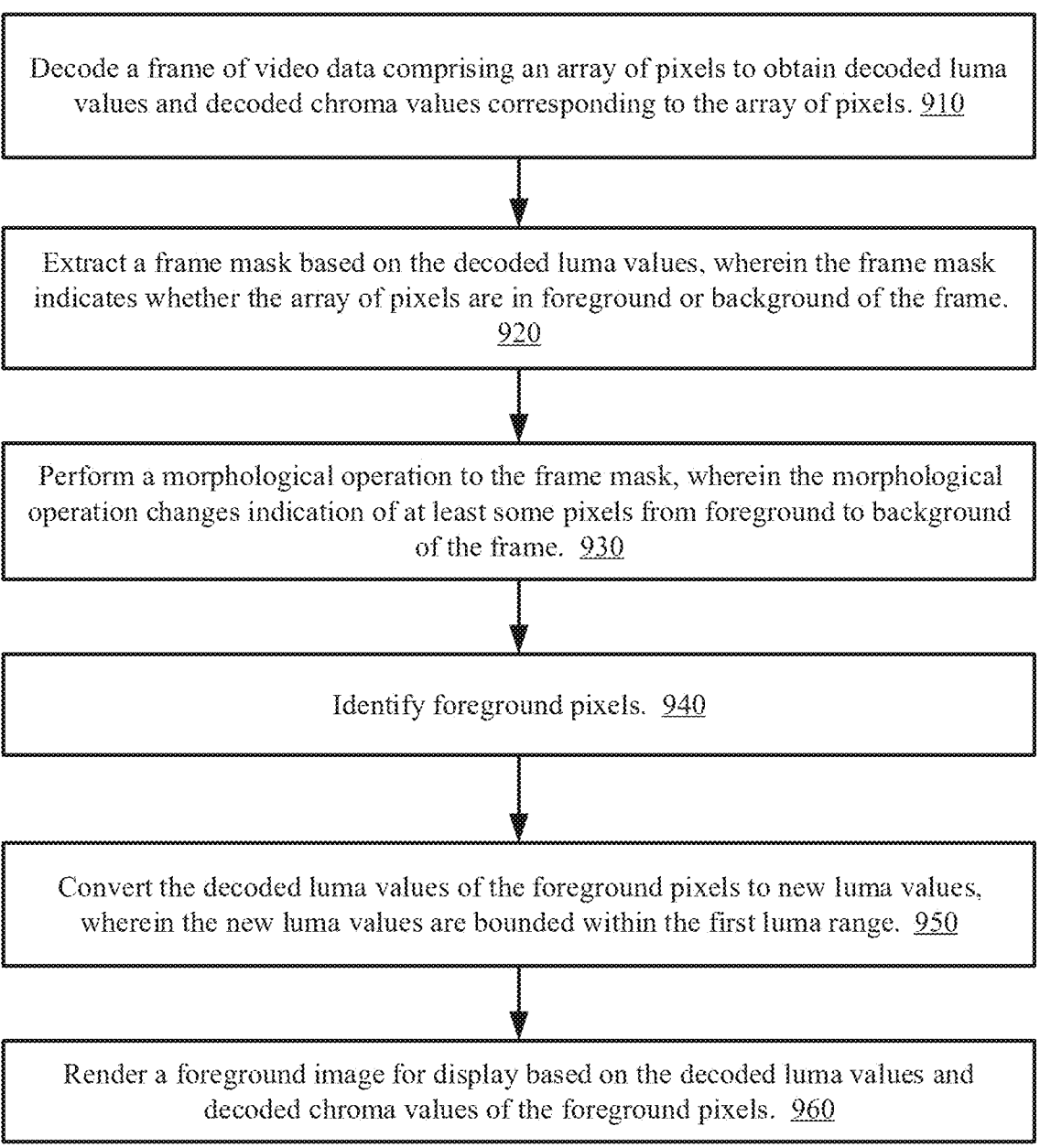
FIG. 9 is a flowchart of an example detailed method of extracting a frame mask from a video frame and using the frame mask to render a foreground image.

FIG. 9 shows a flowchart depicting of an example detailed method 900 of extracting a frame mask from a video frame and using the frame mask to render a foreground image. The depicted method 900 can be implemented by a video decoder (e.g., 440).

At 910, the method 900 can decode (e.g., using the decoding engine 442) a frame of video data comprising an array of pixels to obtain decoded luma values and decoded chroma values corresponding to the array of pixels.

At 920, the method 900 can extract a frame mask (e.g., using the mask extractor 452) based on the decoded luma values. The frame mask can have mask values that indicate whether the array of pixels are in foreground or background of the video frame. As noted above, the extracted frame mask at the receiver side can be different from the original frame mask embedded in the video frame at the sender side.

At 930, the method 900 can perform a morphological operation to the frame mask (e.g., using the morphological processor 454), and such morphological operation can change indication of at least some pixels from foreground to background of the video frame. As noted above, the morphological operations performed at the receiver side and the sender side are configured to be dual operations and have opposite effects on the frame mask.

At 940, the method 940 can identify foreground pixels based on the extracted frame mask (which can be morphologically processed at 930).

At 950, the method 900 can convert the decoded luma values of the foreground pixels to new luma values (e.g., using the inverse mapping engine 456) so that the new luma values are bounded within the first luma range described above in FIGS. 6-7. As described above, before converting, the luma values of the foreground pixels at the receiver side can have a range that is different from the second luma range that is described above in FIGS. 6-7.

At 960, the method 900 can render a foreground image for display based on the decoded luma values and decoded chroma values of the foreground pixels (e.g., using the RGB converter 444 and the rendering engine 446).

Similarly, the method 900 depicted in FIG. 9 includes both morphological operations (at 930) and converting (i.e., inverse mapping) operations (at 950). Alternatively, either the morphological operation (at 930) or the inverse mapping operation (at 950) can be optional. For example, if no morphological operation (e.g., 610 or 720) is performed at the sender side, then the morphological operations (at 930) at the receiver side can be excluded. Likewise, if no mapping operation (e.g., 620 or 740) is performed at the sender side, then the inverse mapping operations (at 950) can be excluded.

Example Luma Range and Safety Margin for Frame Mask Embedding

Figure 10:
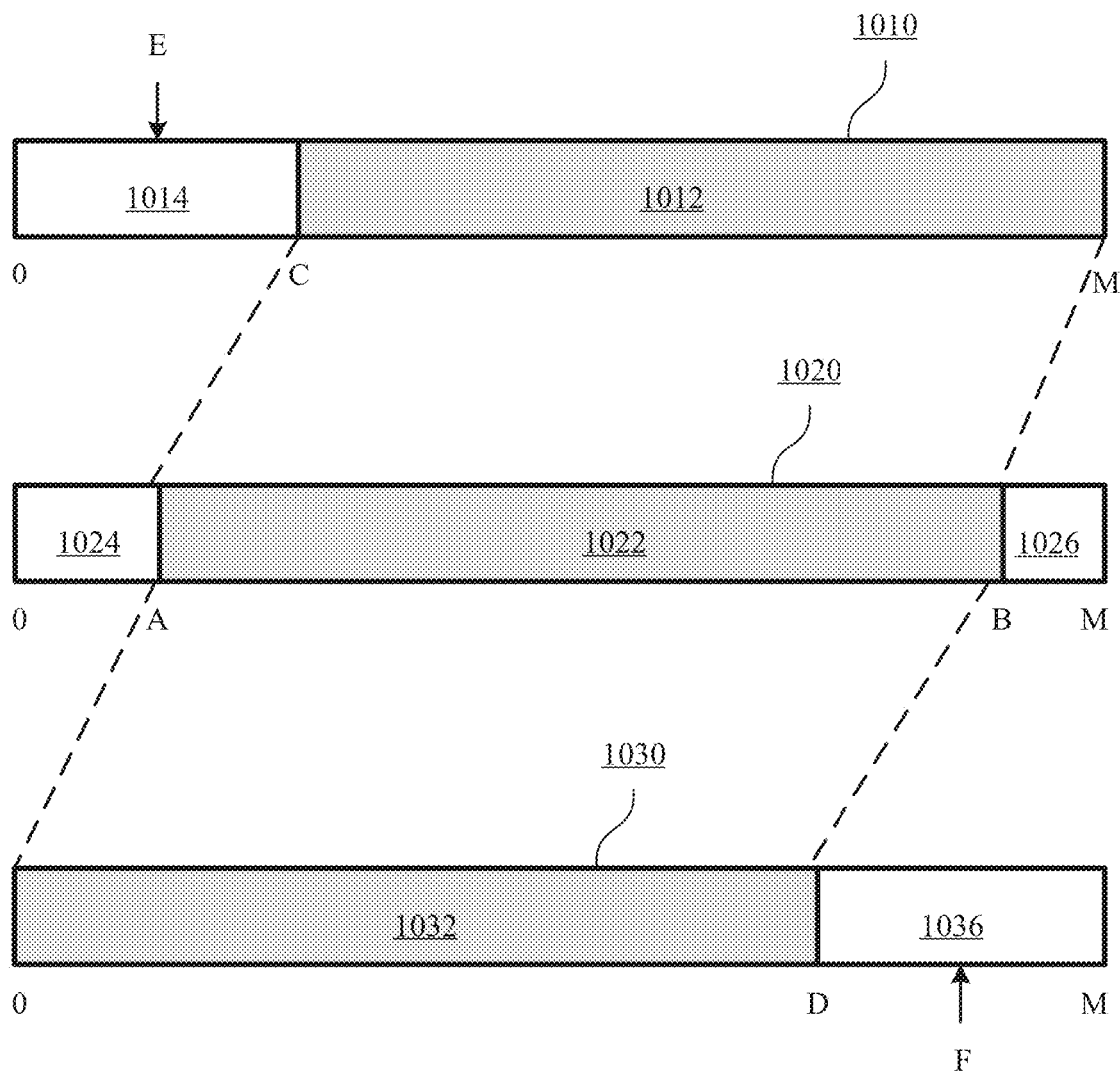
FIG. 10 is a diagram schematically illustrating a method of embedding a frame mask in a video frame using luma mapping.

FIG. 10 schematically illustrates a method of embedding a frame mask in a video frame using luma mapping.

In the depicted example, 1020 denotes the full range of luma values, i.e., [0, M], that can be set for a pixel in a video frame. Here, M denotes a predefined maximum luma value that is can be set for a pixel, which generally depends on luma resolution of the video frame. For example, M is 255 for 8-bit luma resolution, i.e., the luma value for a pixel can be set in the range from 0 to 255.

In the depicted example, A and B respectively denotes the lower and upper limits of a first luma range 1022 that bound the original luma values (at the sender side) corresponding to the pixels in the video frame. In other words, the original luma values do not span the full range [0, M], instead they are bounded within the first luma range 1022. As described above, video coding often uses "Studio Swing," which shifts and scales the luma value to the range [16, 236] rather than using the full range of [0, 255]. In such cases, A=16 and B=236. In other circumstances, A and B can be set to other values so long as 0<A<B<M.

As described above, if a frame mask is embedded in the video frame by setting the luma value for all background pixels to 0, the range [0, A] will create a lower end "safety margin" 1024 to the lowest allowed foreground luma value (i.e., A). To extract the frame mask at the receiver side, a threshold that is between 0 and A can be specified such that pixels with luma values greater than the threshold are deemed to be in the foreground and pixels with luma values less than or equal to the threshold are deemed to be in the background. If the video coding artifacts stay within the threshold, the frame mask embedded in the video frame can be faithfully extracted. However, if the video coding artifacts are greater than the threshold, the extracted frame mask by the receiver will not match the original frame mask embedded in the video frame.

Similarly, if a frame mask is embedded in the video frame by setting the luma value for all background pixels to M, the range [B, M] will create an upper end "safety margin" 1026 to the highest allowed foreground luma value (i.e., B). To extract the frame mask at the receiver side, a threshold that is between B and M can be specified such that pixels with luma values less than the threshold are deemed to be in the foreground and pixels with luma values greater than or equal to the threshold are deemed to be in the background. Likewise, depending on how large the video coding artifacts are, the frame mask embedded in the video frame may or may not be faithfully extracted.

For luma value 0 or 255, chroma value does not affect the color. Thus, to embed a frame mask, the chroma values for background pixels can be set to a predefined background chroma value. Setting such flat background chroma values can improve the coding efficiency and also improve privacy, although it would still be possible to restore much of the background from the chroma values alone (e.g., by using a deep learning artificial intelligence algorithm). In one particular example, the chroma values for all background pixels can be set to a mid-value of the chroma range, e.g., 128 when the full range of the chroma value is [0, 255]. Since the sharp edge along the image contour if often less strong on average, such setting can lead to more efficient video coding.

Example Luma Mapping and Inverse Luma Mapping

As described herein, luma mapping can be used to increase the safety margin, thus increasing the robustness of embedding frame masks in a video stream against the video coding artifacts. Luma mapping can be achieved by means of luma shifting, or luma compression, or both. Luma mapping can be implemented by a mapping engine (e.g., 434) at the sender side, and a corresponding inverse luma mapping can be implemented by an inverse mapping engine (e.g., 456) at the receiver side.

In FIG. 10, 1010 denotes the full range of luma values, i.e., [0, M], after "upward" luma shifting, where the upper limit of the first luma range (i.e., B) is shifted upwardly to M and the lower limit of the first luma range (i.e., A) is shift upwardly to C, where C>A. In other words, the first luma range 1022 is mapped to a second luma range 1012. Without luma compression, the width of the second luma range 1012 is identical to the width of the first luma range 1022, i.e., M−C=B−A. For example, if the first luma range is [16, 236], the second luma range will be [36, 255]. With luma compression, the width of the second luma range 1012 is smaller than the width of the first luma range 1022, i.e., M−C<B−A. For example, if the first luma range is [16, 236], then C will be greater than 36.

Specifically, the following mapping function can be used to convert any luma value y within the first luma range 1022 to an updated luma value y' within the second luma range 1012:

$$y'=\alpha(y-A)+C$$

Here, α is a predefined compression factor that is greater than 0 and less than or equal to 1. If α=1, there is no luma compression. Decreasing α can lead to larger luma compression (i.e., smaller width of the second luma range 1012). Depending on the resolution of the luma values, α can be set to be 0.75, 0.8, 0.85, 0.9, 0.95, 1, or any other values between 0 and 1. In certain embodiments, α can be selected so that the upper limit of the first luma range (i.e., B) is mapped to M, e.g., by setting α=(M−C)/(B−A).

Thus, if a frame mask is embedded in the video frame by setting the luma value for all background pixels to 0, by shifting the first luma range 1022 upwardly to 1012, the safety margin at the lower end is increased, i.e., from 1024 to 1014 (since C>A). Further increase of the safety margin can be achieved by luma compression (i.e., to make M−C<B−A) at the cost of reduction of the fidelity of the luma image (i.e., reduced luma resolution). To extract the frame mask at the receiver side, a threshold E, where 0<E<C, can be specified such that pixels with luma values greater than E are deemed to be foreground pixels and pixels with luma values less than or equal to E are deemed to be background pixels. In certain embodiments, E can be set to approximately half of the lower limit of the second luma range C, i.e., E=C/2. If C is an odd number, round, floor, or ceiling function can be applied to C/2 to ensure E is an integer. As described herein, "approximately" means the variation is within 5 LSB, or within 3 LSB, or in one particular example, within 1 LSB. In certain embodiments, E can be set to a non-middle value within the safety margin. For example, E can be set to approximately ⅓, ¼, ⅔, ¾, or any other fraction of C.

At the receiver side, the decoded luma values (y') of the identified foreground pixels can be converted to new luma values (y) by applying the following inverse mapping function which reverses the mapping function described above.

$$y=(y'-C)/\alpha+A$$

Due to the coding artifacts, the decoded luma values can be outside the second luma range 1012 (e.g., some of the decoded luma values can be less than C). Thus, as described herein, the output of the inverse mapping function can be clipped by applying an upper limit B and a lower limit A so that the converted new luma values are restricted within the first luma range 1022, i.e., [A, B]. In other words, the converted new luma values at the receiver side are restored to the first luma range of the original luma values at the sender side.

As an alternative, FIG. 10 shows 1030 which denotes the full range of luma values, i.e., [0, M], after "downward" luma shifting, where the upper limit of the first luma range (i.e., B) is shifted downwardly to D (i.e., B>D) and the lower limit of the first luma range (i.e., A) is shift downwardly to 0. In other words, the first luma range 1022 is mapped to a second luma range 1032. Without luma compression, the width of the second luma range 1032 is identical to the width of the first luma range 1022, i.e., D=B−A. For example, if the first luma range is [16, 236], the second luma range will be [0, 220]. With luma compression, the width of the second luma range 1032 is smaller than the width of the first luma range 1022, i.e., D<B−A. For example, if the first luma range is [16, 236], then D will be less than 220.

Specifically, the following mapping function can be used to convert any luma value y within the first luma range 1022 to an updated luma value y' within the second luma range 1032:

$$y'=\beta(y-A)$$

Here, β is a predefined compression factor that is greater than 0 and less than or equal to 1. If β=1, there is no luma compression. Decreasing β can lead to larger luma compression (i.e., smaller width of the second luma range 1032). Depending on the resolution of the luma values, β can be set to be 0.75, 0.8, 0.85, 0.9, 0.95, 1, or any other values between 0 and 1. In certain embodiments, β can be selected so that the upper limit of the first luma range (i.e., B) is mapped to D, e.g., by setting β=D/(B−A).

Thus, if a frame mask is embedded in the video frame by setting the luma value for all background pixels to M, by shifting the first luma range 1022 downwardly to 1032, the safety margin at the upper end is increased, i.e., from 1026 to 1036 (since B>D). Further increase of the safety margin can be achieved by luma compression (i.e., to make D<B−A) at the cost of reduction of the fidelity of the luma image (i.e., reduced luma resolution). To extract the frame mask at the receiver side, a threshold F, where D<F<M, can be specified such that pixels with luma values greater than or equal to F are deemed to be background pixels and pixels with luma values less than F are deemed to be foreground pixels. In certain embodiments, F can be set to approximately half of the difference between M and D, i.e., F=(M−D)/2. If M−D is an odd number, round, floor, or ceiling function can be applied to (M−D)/2 to ensure F is an integer. As described herein, "approximately" means the variation is within 5 LSB, or within 3 LSB, or in one particular example, within 1 LSB. In certain embodiments, F can be set to other values within the safety margin. For example, F can be set to approximately ⅓, ¼, ⅔, ¾, or any other fraction of M−D.

At the receiver side, the decoded luma values (y') of the identified foreground pixels can be converted to new luma values (y) by applying the following inverse mapping function which reverses the mapping function described above.

$$y=y'/\beta+A$$

Due to the coding artifacts, the decoded luma values can be outside the second luma range 1032 (e.g., some of the decoded luma values can be greater than D). Thus, as described herein, the output of the inverse mapping function can be clipped by applying an upper limit B and a lower limit A so that the converted new luma values are restricted within the first luma range 1022, i.e., [A, B]. In other words, the converted new luma values at the receiver side are restored to the first luma range of the original luma values at the sender side.

Example Alternatives for Mapping and Inverse Mapping

In the examples shown in FIG. 10, upward luma shifting maps the upper limit of the first luma range (i.e., B) to the maximum luma value M, and downward luma shifting maps the lower limit of the first luma range (i.e., A) to the minimum luma value 0. More generally, for upward luma shifting, the upper limit of the first luma range (i.e., B) can be mapped to any value that is larger than B and smaller than M, and the lower limit of the first luma range (i.e., A) can be mapped to any value that is larger than 0 and smaller than A. The corresponding mapping function and inverse mapping function can be similarly defined.

Although FIG. 10 shows examples of upward luma shifting and downward luma shifting to respectively increase the lower end safety margin and upper end safety margin, it is to be understood the lower end safety margin and/or upper end safety margin can be increased by luma compression alone without upward or downward luma shifting. For example, by increasing the lower limit A while keeping the upper limit B unchanged, the width of the first luma range 1022 is reduced and the lower end safety margin 1024 is increased. Similarly, by decreasing the upper limit B while keeping the lower limit A unchanged, the width of the first luma range 1022 is reduced and the upper end safety margin 1026 is increased. Thus, the mapping and inverse mapping functions described above can be based on luma shifting alone, or luma compression alone, or both.

In the examples described above, both luma mapping and inverse luma mapping are implemented based on linear transformations. In other examples, nonlinear transformations can be used for mapping and/or inverse mapping of luma values. For example, in certain examples, a lookup table can be used to map or inversely map luma values in one luma range to corresponding luma values in another luma range.

In the examples described above, luma keying is used for embedding a frame mask in a video frame by setting the background pixels to a predefined luma value (e.g., 0 or 255). In such circumstances, mapping and inverse mapping functions can be applied to luma values of the foreground pixels to increase the safety margin against coding artifacts. It is to be understood that similar mapping and inverse mapping methods can be applied to chroma values, e.g., when chroma keying is used for embedding a frame mask in a video frame by setting background pixels to some fixed chroma values (e.g., corresponding to one of the four corners 320, 340, 360, and 380 shown in FIG. 3). In such circumstances, mapping and inverse mapping functions can be applied to both chroma values in both U and V channels (i.e., two-dimensional mapping and inverse mapping functions) to further increase the safety margin against coding artifacts.

Example Effect of Morphological Operations on Frame Masks

As noted above, embedding an image frame by setting background pixels to a predefined luma value can be associated with an undesired "background bleeding" effect. As an example, FIG. 11 shows one decoded video frame 1100 that is rendered by a video receiver. In this example, the original video frame at the sender side is embedded with a frame mask that sets the luma values of all background pixels to 0 (i.e., black color). At the receiver side, the embedded video mask can be extracted, e.g., by applying a thresholding function to the mask values in the frame mask, to separate foreground pixels from background pixels. Then, a foreground image comprising the foreground pixels can be rendered. As depicted, the video frame 1100 includes the foreground image 1110 presented over a white background 1120 (i.e., the background of the original video frame is replaced with white pixels), and a contour 1140 defines a boundary between the foreground image 1110 and the background 1120. Notably, a plurality of pixels 1130 are shown as black dots scattered along the contour 1140. The appearance of these undesirable black-dot pixels 1130 is due to the "background bleeding" effect. Specifically, they are generated as video coding artifacts when the video encoder mixes the luma values of foreground pixels (adjacent the contour 1140) with the fixed luma value (i.e., 0) of neighboring background pixels.

In any of the examples described herein, such background bleeding effect can be reduced or eliminated by applying morphological operations to the frame mask embedded in the video frame, as described below. The effect of such morphological operations can be seen from the decoded video frame 1150, which includes the foreground image 1160 presented over a white background 1170, and a contour 1180 defines a boundary between the foreground image 1160 and the background 1170. As shown, the contour 1180 has a relatively smooth gray scale transition without perceivable black-dot contamination caused by bleeding of black background pixels.

Example Dilation and Erosion Operations

As described herein, morphological operations can be performed on frame masks in both the sender side (e.g., by the morphological processor 432) and the receiver side (e.g., by the morphological processor 454). The morphological operation performs on the sender side and the receiver side are configured to be dual operations with respect to each other so that they have opposite effects on the frame mask.

Two example morphological operations are dilation and erosion. Dilation adds pixels to the boundaries of objects in an image, whereas erosion have the effect of removing pixels on object boundaries. Dilation and erosion operators are dual operators because one can be written in terms of the other and they have opposite effects to the image on which they operate. For example, dilation of the foreground can be written equivalently as erosion of the background. Likewise, dilation of the background can be written equivalently as erosion of the foreground.

For dilation and erosion operations, the number of pixels added or removed from the objects in an image depends on the size and shape of a structuring element (also referred to as "kernel") used to process the image. In the dilation and erosion operations, the state of any given pixel in the output image is determined by applying a rule to the corresponding pixel and its neighbors in the input image. For dilation operation, the rule sets the value of the output pixel to the maximum value of all pixels in the neighborhood. In a binary image, a pixel is set to 1 if any of the neighboring pixels have the value 1. For erosion operation, the rule sets the value of the output pixel to be the minimum value of all pixels in the neighborhood. In a binary image, a pixel is set to 0 if any of the neighboring pixels have the value 0. For two-dimensional morphological operations, the kernel is typically a predefined two-dimensional grid or array. For a corresponding pixel, what pixels are considered as its neighboring pixels is determined by the size of the kernel, e.g., the larger the kernel size, the more neighboring pixels.

Example Method of Applying Morphological Operations to Frame Masks

According to certain embodiments, when encoding a video frame at the sender side, a dilation operator is applied to a foreground mask of the video frame. The foreground mask can be generated by a segmentation engine (e.g., 422) and comprise a plurality of mask values identifying pixels that are in the foreground of the frame. The kernel used by the dilation operator can be an N-by-N grid, where N is an integer. In certain embodiments, N is an odd number. In certain embodiments, N can be an even number. In certain embodiments, the dilation kernel can be a non-square matrix where the number of rows differs from the number of columns. In one particular example, N is 3, thereby defining a 3-by-3 dilation kernel. When applying such 3-by-3 dilation kernel to the foreground mask, it can set a mask value of the corresponding pixel to 1 (i.e., indicating it is a foreground pixel) if any of its 8 neighbors are foreground pixels. Thus, it can introduce an extra pixel of foreground around the contour. In other words, for pixels along the contour that separates foreground from background of the frame, it can change the indication of the corresponding pixel from background to foreground.

Correspondingly, when decoding the video frame at the receiver side, an erosion operator is applied to an extracted foreground mask. As described above, the extracted foreground mask can be generated by a mask extractor (e.g., 452) and comprise a plurality of mask values identifying pixels that are in the foreground of the frame. The kernel used by the erosion operator can be an N'-by-N' grid, where N' is an integer. In certain embodiments, N' is an odd number. In certain embodiments, N' can be an even number. In certain embodiments, the erosion kernel can be a non-square matrix where the number of rows differs from the number of columns. The size of the erosion kernel can be the same as or different from the size of the dilation kernel described above. In one particular example, N' is 3, thereby defining a 3-by-3 erosion kernel. When applying such 3-by-3 erosion kernel to the extracted foreground mask, it can set a mask value of the corresponding pixel to 0 (i.e., indicating it is a background pixel) if any of its 8 neighbors are background pixels. Thus, it can remove a foreground pixel from the contour. In other words, for pixels along the contour that separates foreground from background of the frame, it can change the indication of the corresponding pixel from foreground to background.

Because of the duality of dilation and erosion operations, the morphological operations performed at the sender side and receiver side can be switched by changing the foreground frame to background frame.

For example, when encoding a video frame at the sender side, an erosion operator can be applied to a background mask of the video frame. The background mask can be generated by a segmentation engine (e.g., 422) and comprise a plurality of mask values identifying pixels that are in the background of the frame. The kernel size of the erosion operator can be defined in a similar manner as described above. As a result, the erosion operation can change indication of at least some pixels from background to foreground of the frame.

Correspondingly, when decoding the video frame at the receiver side, a dilation operator can be applied to an extracted background mask. The extracted background mask can be generated by a mask extractor (e.g., 452) and comprise a plurality of mask values identifying pixels that are in the background of the frame. The kernel size of the dilation operator can be defined in a similar manner as described above. As a result, the dilation operation can change indication of at least some pixels from foreground to background of the frame.

Note that dilation and erosion operations are dual of each other, not inverse of each other. Thus, dilation followed by erosion (or erosion followed by dilation) generally will not perfectly restore the frame mask. As a result, it is possible that tiny holes or thin "bays" may be filled as foreground.

However, for real-time foreground segmentation in video calling, the video frames are normally segmented at a limited resolution. As a result, such holes and bays are typically not present in the frame mask to be transmitted, and even if some of the holes and/or bays are present in the transmitted frame mask, they are unlikely to be perceivable by viewers.

Example Bounding Box Defining a Smaller Frame Mask

In the examples described above, the frame mask embedded in a video frame has the same size as the video frame, i.e., the number of mask values in the frame mask is the same as the number of pixels in the video frame. Thus, the operations described above (e.g., the mapping operations on the luma values of foreground pixels, the morphological operations on the frame mask) are applied to all pixels of the video frame.

In alternative embodiments, after foreground segmentation (e.g., by the segmentation engine 422), the video encoder (e.g., 420) can define a bounding box which is the smallest rectangle that encloses all foreground pixels. The video encoder can send this bounding box as meta information along each transmitted video frame. For example, four integers can define the coordinates of four sides of the bounding box (e.g., left, top, right, bottom). In such circumstances, the frame mask embedded in the video frame can be limited to the bounding box (e.g., only background pixels contained in the bounding box are set to 0 or 255). Accordingly, at the sender side, mapping operations of the luma values and/or morphological operations on the frame mask can be applied only to pixels contained in the bounding box. At the receiver side, the mask extraction only needs to be performed within the bounding box. All pixels outside the bounding box can efficiently be set to background without any computation. Similarly, the inverse mapping of luma values and morphological operations on the extracted frame mask can be limited to pixels located within the bounding box, thus reducing the computation load.

Example Advantages

A number of advantages can be achieved via the technology described herein. For example, the technology described herein allows efficiently and reliably embedding frame masks in a video stream, and can be implemented in hardware, software, firmware, or any combination thereof. Specifically, by means of luma mapping at the sender side and inverse luma mapping at the receiver side, the safety margin of luma keying can be increased, thereby increasing the robustness of embedding frame masks in a video stream against the video coding artifacts. In addition, by means of morphological operations on the frame masks, the "background bleeding" effect can be reduced or eliminated, thereby improving the quality of rendered foreground images. Importantly, the frame mask embedding technology described herein can be implemented using existing video coding standards, thus can be incorporated into different video processing systems.

Computing Systems

Figure 12:
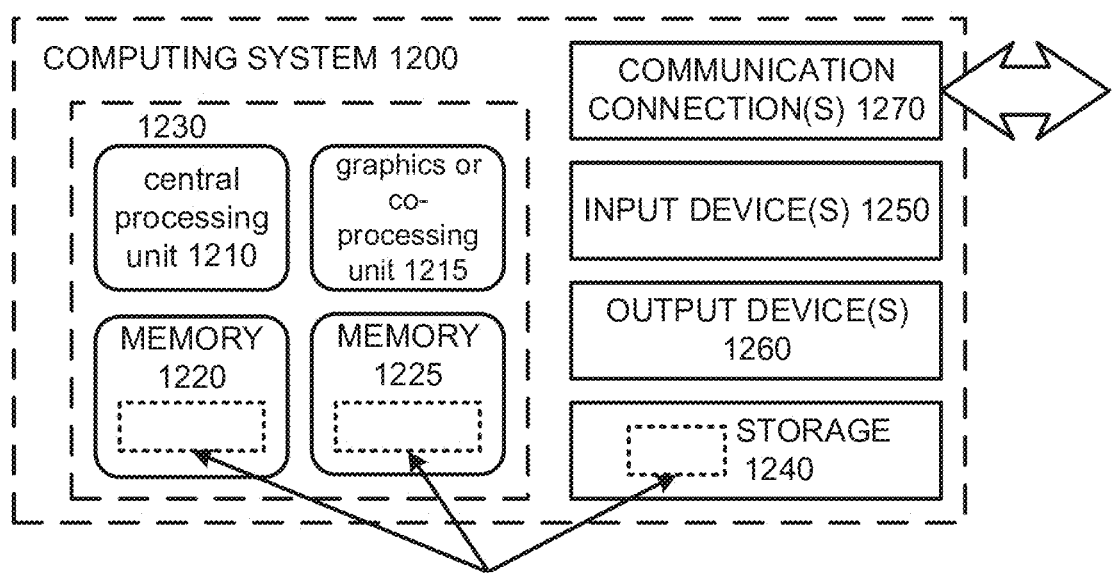
FIG. 12 is a diagram of an example computing system in which some described embodiments can be implemented.

FIG. 12 depicts a generalized example of a suitable computing system 1200 in which the described technologies may be implemented. The computing system 1200 is not intended to suggest any limitation as to scope of use or functionality, as the technologies may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more technologies described herein (e.g., methods 500, 600, 700, 800, and 900), in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information and which can be accessed within the computing system 1200. The storage 1240 stores instructions for the software 1280 implementing one or more technologies described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 13:
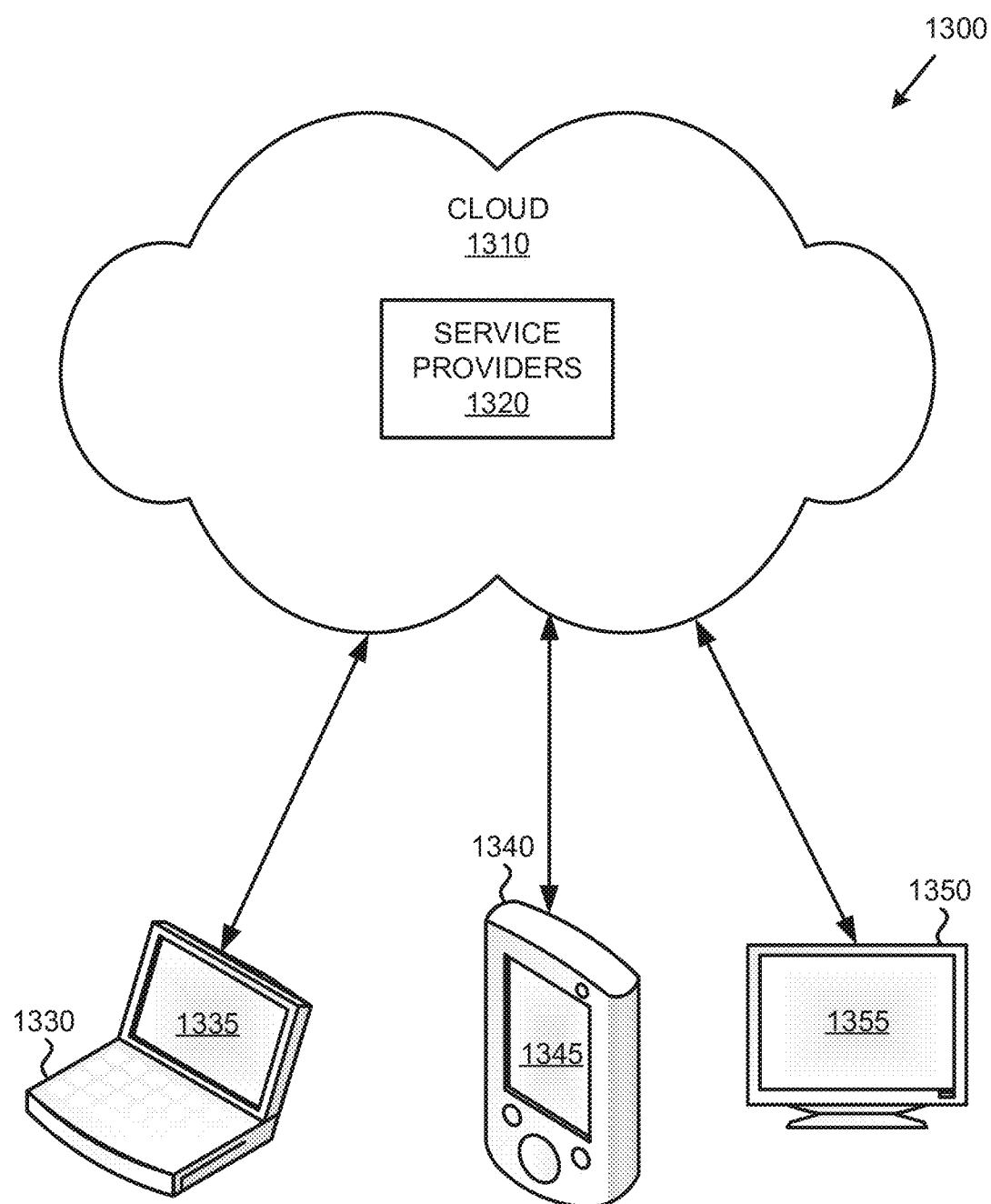
FIG. 13 is an example cloud-support environment that can be used in conjunction with the technologies described herein.

FIG. 13 illustrates a generalized example of a suitable cloud-supported environment 1300 in which described embodiments, techniques, and technologies may be implemented. For example, certain video encoding and/or video decoding tasks described above can be implemented in the cloud-supported environment 1300. In the example environment 1300, various types of services (e.g., computing services) are provided by a cloud 1310. For example, the cloud 1310 can comprise a collection of computing devices, which may be located centrally or distributed, that provide cloud-based services to various types of users and devices connected via a network such as the Internet. The implementation environment 1300 can be used in different ways to accomplish computing tasks. For example, some tasks (e.g., processing user input and presenting a user interface) can be performed on local computing devices (e.g., connected devices 1330, 1340, 1350) while other tasks (e.g., storage of data to be used in subsequent processing) can be performed in the cloud 1310.

In example environment 1300, the cloud 1310 provides services for connected devices 1330, 1340, 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smart phone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, 1350 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touchscreen capability of a particular connected device (e.g., connected devices 1330, 1340, 1350).

In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 12, computer-readable storage media include memory 1220 and 1225, and storage 1240. The term computer-readable storage media does not include signals and carrier waves. In addition, the term computer-readable storage media does not include communication connections, such as 1270.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

As described in this disclosure and in the claims, the singular forms "a," "an," and "the" include the plural forms unless the context clearly dictates otherwise. Additionally, the term "includes" means "comprises." Further, "and/or" means "and" or "or," as well as "and" and "or."

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computing device comprising:
   memory;
   one or more hardware processors coupled to the memory; and
   one or more computer readable storage media storing instructions that, when loaded into the memory, cause the one or more hardware processors to perform operations comprising:
   decoding a frame of video data comprising an array of pixels to obtain decoded luma values and decoded chroma values corresponding to the array of pixels;
   extracting a frame mask based on the decoded luma values, wherein the frame mask comprises an array of mask values, wherein each mask value corresponds to one of the pixels and indicates whether the corresponding pixel is in foreground or background of the frame;
   performing a morphological operation to the frame mask based on comparison of each mask value with its neighboring mask values, wherein the morphological operation changes one or more mask values to indicate their corresponding pixels are removed from the foreground and added to the background of the frame;
   identifying foreground pixels after performing the morphological operation to the frame mask; and
   rendering a foreground image for display based on the decoded luma values and decoded chroma values of the identified foreground pixels.

2. The computing device of claim 1, wherein extracting the frame mask comprises:
   comparing the decoded luma values with a predefined luma threshold;
   when a decoded luma value of a pixel is less than or equal to the predefined luma threshold, assigning a mask value corresponding to the pixel to indicate the pixel is in the background of the frame; and
   when a decoded luma value of a pixel is greater than the predefined luma threshold, assigning a mask value corresponding to the pixel to indicate the pixel is in the foreground of the frame.

3. The computing device of claim 1, wherein extracting the frame mask comprises:
   comparing the decoded luma values with a predefined luma threshold;
   when a decoded luma value of a pixel is greater than or equal to the predefined luma threshold, assigning a mask value corresponding to the pixel to indicate the pixel is in the background of the frame; and
   when a decoded luma value of a pixel is smaller than the predefined luma threshold, assigning a mask value corresponding to the pixel to indicate the pixel is in the foreground of the frame.

4. The computing device of claim 1, wherein performing the morphological operation comprises applying an erosion operator to the frame mask, wherein the frame mask is a foreground mask which comprises a plurality of mask values identifying pixels that are in the foreground of the frame.

5. The computing device of claim 1, wherein performing the morphological operation comprises applying a dilation operator to the frame mask, wherein the frame mask is a background mask which identifies a plurality of mask values identifying pixels that are in the background of the frame.

6. The computing device of claim 1, wherein performing the morphological operation comprises applying a kernel to the frame mask, wherein the kernel is a predefined two-dimensional grid.

7. The computing device of claim 6, wherein the kernel is an N-by-N grid, wherein N is an odd number.

8. The computing device of claim 7, wherein N is three.

9. The computing device of claim 1, wherein the operations further comprise restricting the decoded luma values of the foreground pixels to a predefined luma range.

10. The computing device of claim 9, wherein rendering the foreground image comprises converting the decoded luma values and decoded chroma values of the foreground pixels to corresponding RGB color values.

11. A computer-implemented method comprising:
   encoding a frame of video data comprising an array of pixels to generate an encoded video frame; and transmitting the encoded video frame;
wherein encoding the frame of video data comprises:
   receiving a frame mask comprising an array of mask values, wherein each mask value corresponds to one of the pixels and indicates whether the corresponding pixel is in foreground or background of the frame; and
   performing a morphological operation to the frame mask based on comparison each mask value with its neighboring mask values, wherein the morphological operation changes one or more mask values to indicate their corresponding pixels are removed from the background and added to the foreground of the frame.

12. The method of claim 11, wherein encoding the frame of video data further comprises:
   identifying background pixels after performing the morphological operation to the frame mask; and
   setting luma values of the background pixels to a background luma value that is outside a predefined luma range.

13. The method of claim 12, wherein the background luma value is smaller than a lower limit of the predefined luma range.

14. The method of claim 12, wherein the background luma value is greater than an upper limit of the predefined luma range.

15. The method of claim 12, wherein encoding the frame of video data further comprises setting chroma values of the background pixels to a predefined background chroma value.

16. The method of claim 11, wherein performing the morphological operation comprises applying a dilation operator to the frame mask, wherein the frame mask is a foreground mask which comprises a plurality of mask values identifying pixels that are in the foreground of the frame.

17. The method of claim 11, wherein performing the morphological operation comprises applying an erosion operator to the frame mask, wherein the frame mask is a background mask which identifies a plurality of mask values identifying pixels that are in the background of the frame.

18. The method of claim 11, wherein performing the morphological operation comprises applying a kernel to the frame mask, wherein the kernel is a predefined N-by-N grid.

19. A computer-implemented method comprising:
at a video encoder:
   encoding a frame of video data comprising an array of pixels to generate an encoded video frame; and
   transmitting the encoded video frame;
   wherein encoding the frame of video data comprises:
      receiving a first frame mask comprising an array of first mask values, wherein each first mask value corresponds to one of the pixels and indicates whether the corresponding pixel is in foreground or background of the frame; and
      performing a first morphological operation to the first frame mask based on comparison of each first mask value with its neighboring first mask values, wherein the first morphological operation changes indication of at least some pixels from background to foreground of the frame;
at a video decoder:
   decoding the encoded frame of video data to obtain decoded luma values corresponding to the array of pixels;
   extracting a second frame mask based on the decoded luma values, wherein the second frame mask comprises an array of second mask values, wherein each second mask value corresponds to one of the pixels and indicates whether the corresponding pixel is in foreground or background of the frame; and
performing a second morphological operation to the second frame mask based on comparison of each second mask value with its neighboring second mask values, wherein the second morphological operation changes indication of at least some pixels from foreground to background of the frame;
wherein the first morphological operation and the second morphological operations are dual operations with respect to each other.

20. The method of claim 19, wherein:
the first morphological operation is a dilation operation and the second morphological operation is an erosion operation, wherein both the first and second frame masks are foreground masks which identify pixels that are in the foreground of the frame; or
the first morphological operation is an erosion operation and the second morphological operation is a dilation operation, wherein both the first and second frame masks are background masks which identify pixels that are in the background of the frame.

* * * * *